(12) United States Patent
Park et al.

(10) Patent No.: US 9,439,148 B2
(45) Date of Patent: Sep. 6, 2016

(54) METHODS AND ARRANGEMENTS FOR CHANNEL ACCESS IN WIRELESS NETWORKS

(75) Inventors: Minyoung Park, Portland, OR (US); Emily H. Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 13/977,697

(22) PCT Filed: Dec. 30, 2011

(86) PCT No.: PCT/US2011/068252
§ 371 (c)(1),
(2), (4) Date: Feb. 18, 2014

(87) PCT Pub. No.: WO2012/141758
PCT Pub. Date: Oct. 18, 2012

(65) Prior Publication Data
US 2014/0153463 A1    Jun. 5, 2014

Related U.S. Application Data

(60) Provisional application No. 61/475,776, filed on Apr. 15, 2011.

(51) Int. Cl.
*H04W 52/02* (2009.01)
*H04W 74/08* (2009.01)

(52) U.S. Cl.
CPC ..... *H04W 52/0235* (2013.01); *H04W 52/0216* (2013.01); *H04W 74/08* (2013.01)

(58) Field of Classification Search
None
See application file for complete search history.

(56) References Cited

U.S. PATENT DOCUMENTS

| 2005/0141548 A1 | 6/2005 | Koo et al. |
| 2005/0152373 A1 | 7/2005 | Ali |
| 2006/0078001 A1 | 4/2006 | Chandra et al. |

(Continued)

FOREIGN PATENT DOCUMENTS

| CN | 101156391 A | 4/2008 |
| WO | 2012/141758 A1 | 10/2012 |

OTHER PUBLICATIONS

Park et al., "IEEE 802.11 WLAN for Medical-grade QoS", May 18, 2009, 6 pages.

(Continued)

*Primary Examiner* — Feben M Haile
(74) *Attorney, Agent, or Firm* — Schubert Law Group PLLC

(57) ABSTRACT

Embodiments may define traffic priorities to facilitate transmissions for wireless communications devices. Many embodiments comprise MAC sublayer logic to generate and transmit management frames such as beacon frames, association response frames, reassociation response frames, and probe response frames with an access category for low power consumption stations or sensor stations comprising a parameter record defining a contention window that is the earliest contention window to open amongst contention windows defined for the access categories for traffic. In some embodiments, the MAC sublayer logic may store the parameter record sets for access categories in memory, in logic, or in another manner that facilitates transmission of the frames. Some embodiments may receive and detect communications with frames comprising the access categories and store a parameter set for one or more of the access categories in a management information base.

23 Claims, 8 Drawing Sheets

| ACCESS CATEGORY PARAMETER TABLE | | | | 1200 |
|---|---|---|---|---|
| ACCESS CATEGORY | ACI | aCWmin | aCWmax | AIFSN |
| AC_BE | 00 | aCWmin | aCWmax | 10 |
| AC_SS | 01 | (aCWmin+1)/2-1 | aCWmin | 2 |

(56) References Cited

U.S. PATENT DOCUMENTS

| | | | |
|---|---|---|---|
| 2006/0262737 A1 | 11/2006 | Livet et al. | |
| 2008/0123607 A1* | 5/2008 | Jokela | H04L 12/5695 370/338 |
| 2009/0154393 A1 | 6/2009 | Hsu et al. | |
| 2010/0315979 A1* | 12/2010 | Surineni et al. | 370/310 |
| 2011/0194644 A1* | 8/2011 | Liu et al. | 375/295 |

OTHER PUBLICATIONS

IEEE, "Part 11: Wireless LAN Medium Access Control (MAC) and Physical Layer (PHY) Specifications", IEEE Standard for Information technology—Telecommunications and information exchange between systems—Local and metropolitan area networks—Specific requirements, Jun. 12, 2007, 1,233 pages, IEEE, New York, NY, USA.

Office Action received for Chinese Patent Application No. 201210115075.5, mailed on Jun. 3, 2015, 17 pages of English Translation and 7 pages of Chinese Office Action.

Office Action received for Japanese Patent Application No. 2012-061054, mailed on Feb. 19, 2013, 1 page of English Translation and 2 pages of Office Action.

Office Action received for Japanese Patent Application No. 2012-061054, mailed on Jul. 30, 2013, 2 pages of English Translation and 1 page of Office Action.

Office Action received for Chinese Patent Application No. 201210115075.5, mailed on May 9, 2014, 18 pages of English Translation and 10 pages of Office Action.

Ashley, Alex, "Alternate EDCA Parameter Set", doc.: IEEE 802.11-09/0850r5, IEEE P802.11, Wireless LANs, Jan. 19, 2010, 19 pages.

International Preliminary Report on Patentability and Written Opinion received for PCT Patent Application No. PCT/US2011/068252 mailed on Oct. 24, 2013, 6 pages.

International Search Report and Written Opinion received for PCT Patent Application No. PCT/US2011/068252, mailed on May 30, 2012, 9 pages.

Vittorio et al., "An approach to enhance the QoS support to real-time traffic on IEEE 802.11e networks", Jul. 3, 2007, 6 pages.

Vegt, Rolf De, "Potential Compromise for 802.11ah Use Case Document", doc.: IEEE 802.11-11/0457r0, Mar. 17, 2011, 27 pages.

Extended Search Report received for European Patent Application no. 11863490.6, mailed on Sep. 19, 2014, 7 pages.

Jung et al., "An energy efficient MAC protocol for wireless LANs", IEEE INFOCOM 2002, 2002, 9 pages.

Office Action received for Chinese Patent Application No. 201210115075.5, mailed on Dec. 3, 2014, 15 pages of English Translation and 7 pages of Chinese Office Action.

Office Action received for Korean Patent Application No. 2013-7028714, mailed on Dec. 10, 2014, 2 pages of English Translation and 3 pages of Korean Office Action.

Notice of Allowance received for Korean Patent Application No. 2013-7028714, mailed on Feb. 12, 2015, 1 page of English Translation and 2 pages of NOA.

Notice of Allowance received for Japanese Patent Application No. 2012-061054, mailed on Nov. 12, 2013, 1 page of NOA.

Decision to Grant received for European Patent Application No. 11863490.6, mailed on Jan. 28, 2016, 2 pages.

Office Action received for Japanese Patent Application No. 2014-001795, mailed on Feb. 23, 2016, 4 pages of English Translation and 4 pages of Japanese Office Action.

Park et al., "Low Power Capability Support for 802.11ah", doc.: IEEE 802.11-11/0060r1, Jan. 17, 2011, 9 pages.

IEEE, "Part 11: Wireless LAN Medium Access Control (MAC) and Physical Layer (PHY) Specifications", IEEE Standard for Information technology—Telecommunications and information exchange between systems—Local and metropolitan area networks—Specific requirements, Jun. 12, 2007, 1 page of coverpage and 79-87 pages, 130-131 pages, and 251-256 pages, IEEE, New York, NY, USA.

Notice of Reexamination received for Chinese Patent Application No. 201210115075.5, mailed Mar. 29, 2016, 9 pages of English Translation and 7 pages of Chinese Office Action.

* cited by examiner

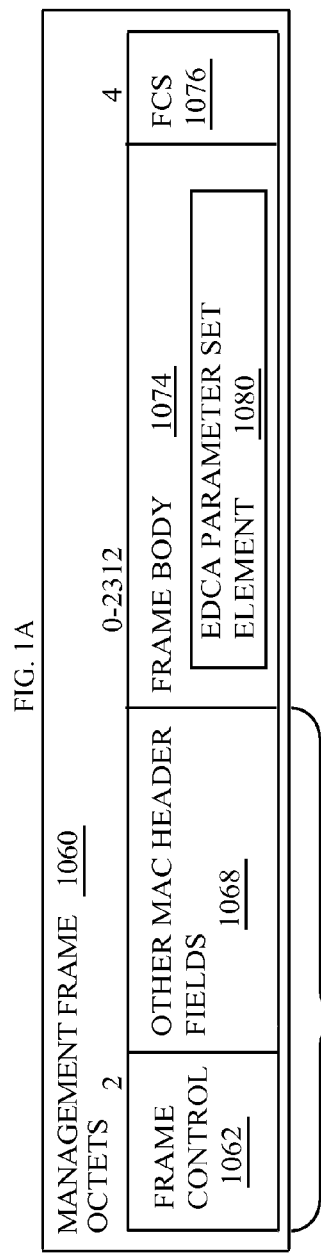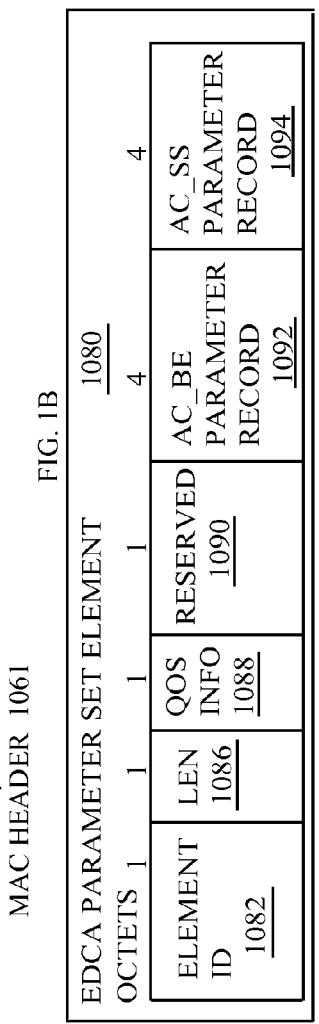

FIG. 1F

EDCA PARAMETER SET ELEMENT 1400

| OCTETS | 1 | 1 | 1 | 1 | 4 | 4 | 4 | 4 |
|---|---|---|---|---|---|---|---|---|
| | ELEMENT ID 1402 | LEN 1406 | QOS INFO 1408 | RESERVED 1410 | AC_BK PARAMETER RECORD 1412 | AC_BE PARAMETER RECORD 1414 | AC_VI PARAMETER RECORD 1416 | AC_VO PARAMETER RECORD 1418 |

FIG. 1G

ACCESS CATEGORY PARAMETER TABLE 1500

| ACCESS CATEGORY | ACI | aCWmin | aCWmax | AIFSN | DESCRIPTION |
|---|---|---|---|---|---|
| AC_BK | 00 | aCWmin | aCWmax | 10 | BACKGROUND |
| AC_BE | 01 | aCWmin | aCWmax | 7 | BEST EFFORT |
| AC_VI | 10 | (aCWmin+1)/2−1 | aCWmin | 7 | VIDEO/VOICE |
| AC_VO | 11 | (aCWmin+1)/4−1 | (aCWmin+1)/2−1 | 2 | SENSOR |

FIG. 1H

EDCA PARAMETER SET ELEMENT 1600

| ELEMENT ID 1602 | LEN 1606 | QOS INFO 1608 | RESERVED 1610 | AC_BK PARAMETER RECORD 1612 | AC_BE PARAMETER RECORD 1614 | AC_VI PARAMETER RECORD 1616 | AC_VO PARAMETER RECORD 1618 | AC_SS PARAMETER RECORD 1620 |
|---|---|---|---|---|---|---|---|---|
| 1 | 1 | 1 | 1 | 4 | 4 | 4 | 4 | 4 |

OCTETS

FIG. 1I

ACCESS CATEGORY PARAMETER TABLE 1700

| ACCESS CATEGORY | ACI | aCWmin | aCWmax | AIFSN | DESCRIPTION |
|---|---|---|---|---|---|
| AC_BK | 000 | aCWmin | aCWmax | 10 | BACKGROUND |
| AC_BE | 001 | aCWmin | aCWmax | 10 | BEST EFFORT |
| AC_VI | 010 | (aCWmin+1)/2-1 | aCWmin | 7 | VIDEO |
| AC_VO | 011 | (aCWmin+1)/2-1 | aCWmin | 4 | VOICE |
| AC_SS | 100 | (aCWmin+1)/4-1 | (aCWmin+1)/2-1 | 2 | SENSOR |

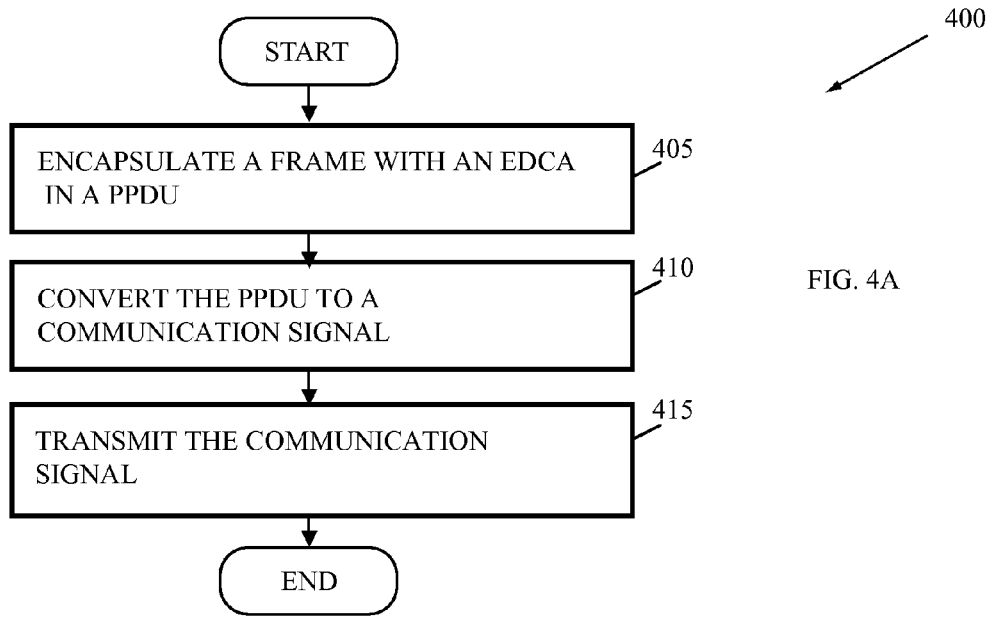

METHODS AND ARRANGEMENTS FOR CHANNEL ACCESS IN WIRELESS NETWORKS

BACKGROUND

Embodiments are in the field of wireless communications. More particularly, embodiments are in the field of communications protocols between wireless transmitters and receivers.

BRIEF DESCRIPTION OF THE DRAWINGS

FIG. 1A depicts an embodiment of a management frame with an enhanced distributed channel access parameter set element for establishing communications between wireless communication devices;

FIG. 1B depicts an embodiment of an enhanced distributed channel access parameter set element for establishing communications between wireless communication devices;

FIG. 1C depicts an embodiment of access category parameter record elements;

FIG. 1D depicts an embodiment of a table for enhanced distributed channel access parameter set elements for establishing communications between wireless communication devices;

FIG. 1F depicts an alternative embodiment for an enhanced distributed channel access parameter set element for establishing communications between wireless communication devices;

FIG. 1G depicts an alternative embodiment of a table for enhanced distributed channel access parameter set elements for establishing communications between wireless communication devices;

FIG. 1H depicts an alternative embodiment for an enhanced distributed channel access parameter set element for establishing communications between wireless communication devices;

FIG. 1I depicts an alternative embodiment of a table for enhanced distributed channel access parameter set elements for establishing communications between wireless communication devices;

FIGS. 4A-B depict embodiments of flowcharts to transmit, receive, and interpret communications with frames with enhanced distributed channel access parameter set elements as illustrated in FIG. 2.

DETAILED DESCRIPTION OF EMBODIMENTS

Figure 1:
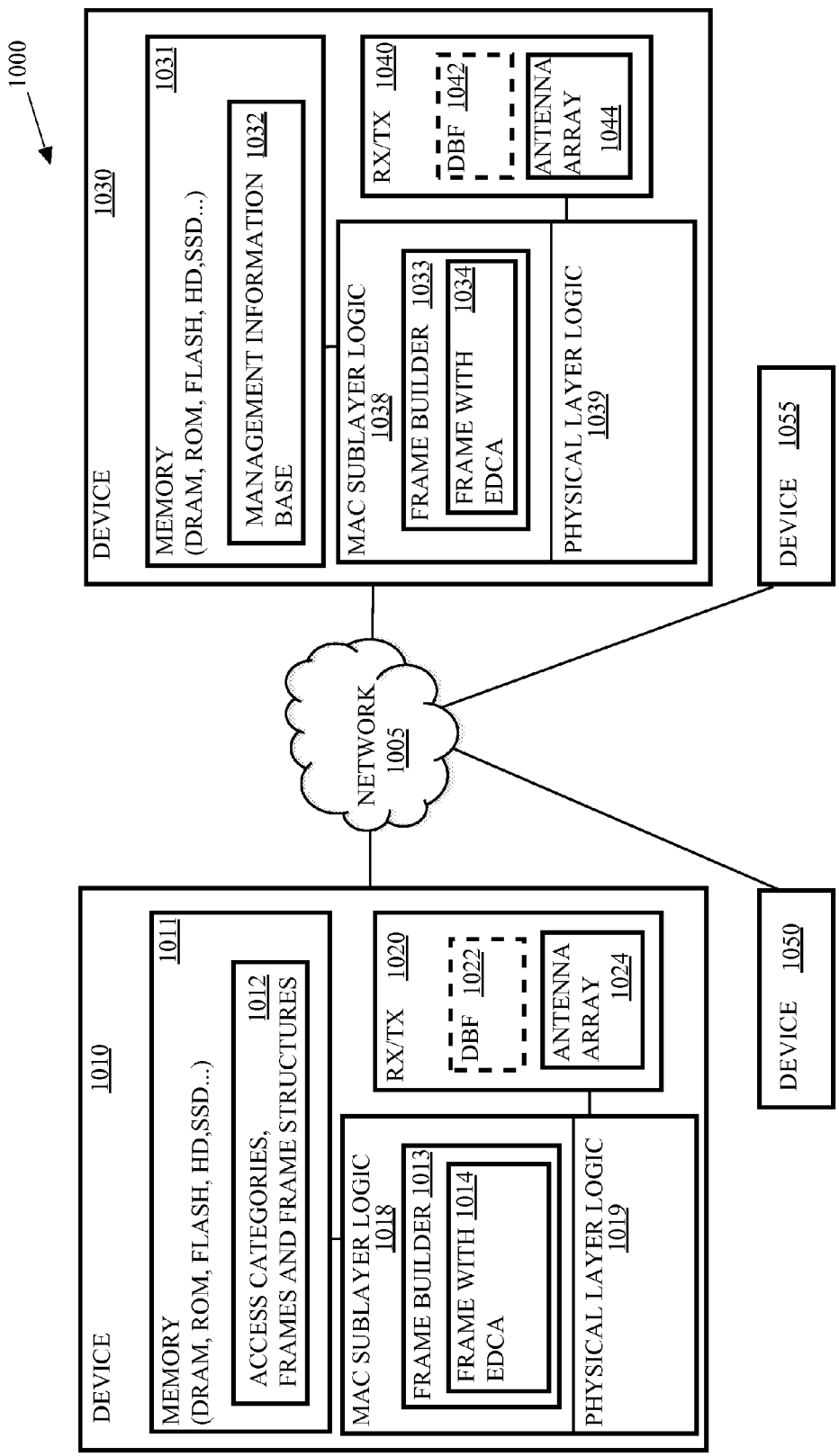
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may define traffic priorities to facilitate transmissions for wireless communications devices. Many embodiments comprise MAC sublayer logic to generate and transmit management frames such as beacon frames, association response frames, reassociation response frames, and probe response frames with an access category for low power consumption stations comprising a parameter record defining a contention window that is the earliest contention window to open amongst contention windows defined for the access categories for traffic. In some embodiments, the MAC sublayer logic may store the parameter record sets for access categories in memory, in logic, or in another manner that facilitates transmission of the frames. Some embodiments may receive and detect communications with frames comprising the access categories and store a parameter set for one or more of the access categories in a management information base.

Some embodiments implement Institute of Electrical and Electronic Engineers (IEEE) 802.11 systems such as IEEE 802.11ah systems. The IEEE 802.11 wireless standard defines EDCA (enhanced distributed channel access), which is a prioritized carrier sense multiple access with collision avoidance (CSMA/CA) access mechanism. IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf).

The EDCA defines four access categories (AC): background (BK), best effort (BE), video (VI), and voice (VO) to provide required quality of service (QoS) for applications. The idea of having different ACs is to guarantee some level of latency requirements for, e.g., voice and video applications. For some devices, such, as low power stations, the QoS requirement, may not be focused on latency but may be focused on low-power consumption by the station. A battery-powered sensor station, for instance, may compete with a station with heavy traffic to transmit a packet to an access point (AP). If both traffic flows are mapped to the same access category, the sensor station will lose the contention for half of the time and have to wait, in a wake state for the channel to become idle, which consumes power. A long channel access delay increases the power consumption of the sensor station and is exacerbated for systems such, as IEEE 802.11ah systems that define 1 Gigahertz (GHz) or lower channel bandwidths.

As a further illustration, a low-powered station such as a sensor device may be powered down to a sleep state, remain in the sleep state, and power up to a wake state when the sensor device has data to transmit. When the sensor device wakes, it will first sense the channel to see if the channel is idle. If the channel is busy, the sensor device continues to sense the channel until the channel becomes idle. This consumes power and the longer the PPDU transmission time of the other station is, the more the power consumption by the sensor device. In sub 1 GHz bandwidth operations, due to narrower bandwidth and much lower data rate compared to 2.4 or 5 Gigahertz (GHz) bandwidths, the physical layer protocol data unit (PPDU) transmission time can be tens of milliseconds.

According to one embodiment, the EDCA is redefined for, e.g., IEEE 802.11ah systems with sub 1 GHz bandwidth operation, to enable low-power consumption stations such as small battery-powered wireless devices (e.g., sensors) to use Wi-Fi to connect to the Internet with very low power consumption. In many embodiments, the energy consumption of low duty cycle stations may be reduced when coexisting with traditional devices that have high to medium load applications (e.g. hotspot or cellular-offloading) by giving the sensor devices higher priority than the other traffic types and, in further embodiments, by limiting the PPDU transmission time.

In some embodiments, the EDCA access categories are redefined to remove VI and VO access categories. In some embodiments, the BK category is combined with the BE category. In further embodiments, a new SS category is defined to add a category for low power consumption stations or sensor stations.

Other embodiments may redefine the EDCA access categories to assign low power stations to the VO category and to reassign voice traffic to the VI category. In many of these embodiments, the low power stations may be assigned to the VO category.

In still other embodiments, a new SS category is defined for low power consumption devices or sensor devices in addition to the current categories of BK, BE, VI, and VO. In such embodiments, the SS parameter record element values may be configured to open a contention window prior to the contention windows for the other categories.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007 and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may transmit an association request frame to the communications device 1010 to request association with the base service set represented by the communications device 1010. The communications device 1010 may respond with an association response frame that comprises an enhanced distributed channel access (EDCA) parameter set element comprising a parameter sets defining access categories for data traffic. In some embodiments, the access categories comprise best efforts (BE) traffic and low power consumption station (SS) traffic and define the contention windows of the access categories to have the first contention window for the SS traffic open prior to the contention window for the BE traffic. Thereafter, the communications device 1030 may store the parameter sets for one or both categories in a management information base 1032 of memory 1031 to facilitate interaction with the communications device 1010 in accordance with the access categories for traffic.

Once the communications device 1030 associates with the communications device 1010, the communications device 1030 may periodically enter an active state or a wake state to transmit data collected such as data related to water usage monitored by the integrated water usage sensor. Upon entering the wake state, the communications device 1030 may wait for a DIFS (distributed coordination function (DCF) interframe space) time unit, back off a number of time slots to determine the opening of a contention time window to the communications device 1010. The communications device 1030 may then transmit one or more data frames to the communications device 1010 of the metering substation to transmit data related to water usage.

In some embodiments, the physical layer protocol data unit transmission time may be limited. For instance, the PPDU transmission time may be limited to be less than T milliseconds. If the transmission is longer than the threshold T milliseconds, the packet may be fragmented so that one PPDU transmission does not consume too much airtime.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and Media Access Control (MAC) sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or frame structures, or portions thereof such as a management frame structure and enhanced distributed channel access parameter set element such as the parameter set elements 1080, 1400 and 1600 illustrated in FIGS. 1B, F, and H. Furthermore, the memory 1011 and 1031 may comprise data to relate values of the parameter set element and parameter records with access categories such as the parameter values illustrated in tables 1200, 1500, and 1700 in FIGS. 1D, G, and I. For example, the memory 1011, 1031 may comprise an indication of values for a minimum contention window (aCWmin), a maximum contention window value (aCWmax), and an arbitration interframe space number (AIFSN) for access categories (AC): AC_BK, AC_BE, AC_VI, and AC_VO: Note that these tables include values that are illustrative so embodiments may use these values and/or other values.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. More specifically, the frame builders 1013 and 1033 may generate frames with an EDCA parameter set element 1014, 1034 and the data unit builders of the physical layer logic 1019, 1039 may encapsulate the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a management frame 1060 for communications between wireless communication devices such as communications devices 1010, 1030, 1050, and 1055 in FIG. 1. The management frame 1060 may comprise a MAC header 1061, a frame body 1074, and a frame check sequence (FCS) field 1076. The MAC header 1061 may comprise the frame control field 1062 and other MAC header fields 1068. The frame control field 1062 may be two octets and may identify the type and subtype of the frame such as a management type and, e.g., a reassociation response frame subtype. The other MAC header fields 1068 may comprise, for example, one or more address fields, identification fields, control fields, or the like.

In some embodiments, such as embodiments, the management frame 1060 may comprise a frame body 1074. The frame body 1074 may be a variable number of octets and may include data elements, control elements, or parameters and capabilities. In the present embodiment, the frame body 1074 comprises an enhanced distributed channel access (EDCA) parameter set element 1080. FIG. 1B illustrates an embodiment of an EDCA parameter set element 1080.

The EDCA parameter set element 1080 may be used by the access point (AP) to establish policy by changing default management information base (MIB) attribute values, to change policies when accepting new stations (STAs) or new traffic, or to adapt to changes in offered load. The most recent EDCA parameter set element 1080 received by a non-AP STA may be used to update the appropriate MIB values.

The EDCA parameter set element 1080 may comprise fields such as an element identifier (ID) field 1082, a length field 1086, a quality of service (QoS) information (info) field 1088, a reserved field 1090, and parameter record elements including AC_BE parameter record 1092 and AC_SS parameter record 1094. The element ID field 1082 may be one octet and may identify the element as an EDCA parameter set element 1080. The length field 1086 may be one octet and may define the length of the EDCA parameter set element 1080. The QoS info field 1088 may be one octet and may contain the EDCA Parameter Set Update Count subfield, which may initially be set to 0 and may be incremented each time any of the AC parameters changes. The EDCA Parameter Set Update Count subfield may be used by non-AP STAs to determine whether the EDCA parameter set has changed and requires updating the appropriate MIB attributes. The reserved field 1090 may be one octet and may be reserved for future use.

The EDCA parameter set element 1080 may also comprise parameter records for each access category including, in the present embodiment, an AC_BE parameter record 1092 and an AC_SS parameter record 1094. In the present embodiment, the voice and video access categories (AC_VI and AC_VO) are removed. Also, AC_BK and AC_BE may be combined into one AC_BE for simplicity. Furthermore, a new sensor access category (AC_SS) is added.

The parameter records may each comprise fields such as the fields illustrated in parameter record elements 1100 in FIG. 1C. The values for the parameter record elements access category index/arbitration interframe space number (ACI/AIFSN) 1104, encoded contention window minimum/maximum (ECWmin/ECWmax) 1106 of the AC_BE parameter record 1092 and the AC_SS parameter record 1094 are illustrated in the access category parameter table 1200 in FIG. 1D. Note that the AIFSN, in the present embodiment, for the best-effort access category, AIFSN [AC_BE], may be increased to 10 so that the sensor traffic has the priority over the best effort traffic when competing in the first round of contention (assuming aCWmin value is 15).

The transmission operations (TXOP) limit 1108 may be specified as an unsigned integer, with the least significant octet transmitted first, in units of, e.g., 32 μs. A TXOP Limit 1108 field value of 0 indicates that a single MAC service data unit (MSDU) or MAC management protocol data unit (MMPDU), in addition to a possible request to send/clear to send (RTS/CTS) exchange or CTS to itself, may be transmitted at any rate for each TXOP.

Referring again to FIG. 1A, in many embodiments, the management frame 1060 may comprise a frame check sequence (FCS) field 1076. The FCS field 1076 may be four octets and may include extra checksum characters added to the short frame 1060 for error detection and correction.

Figure 1E:
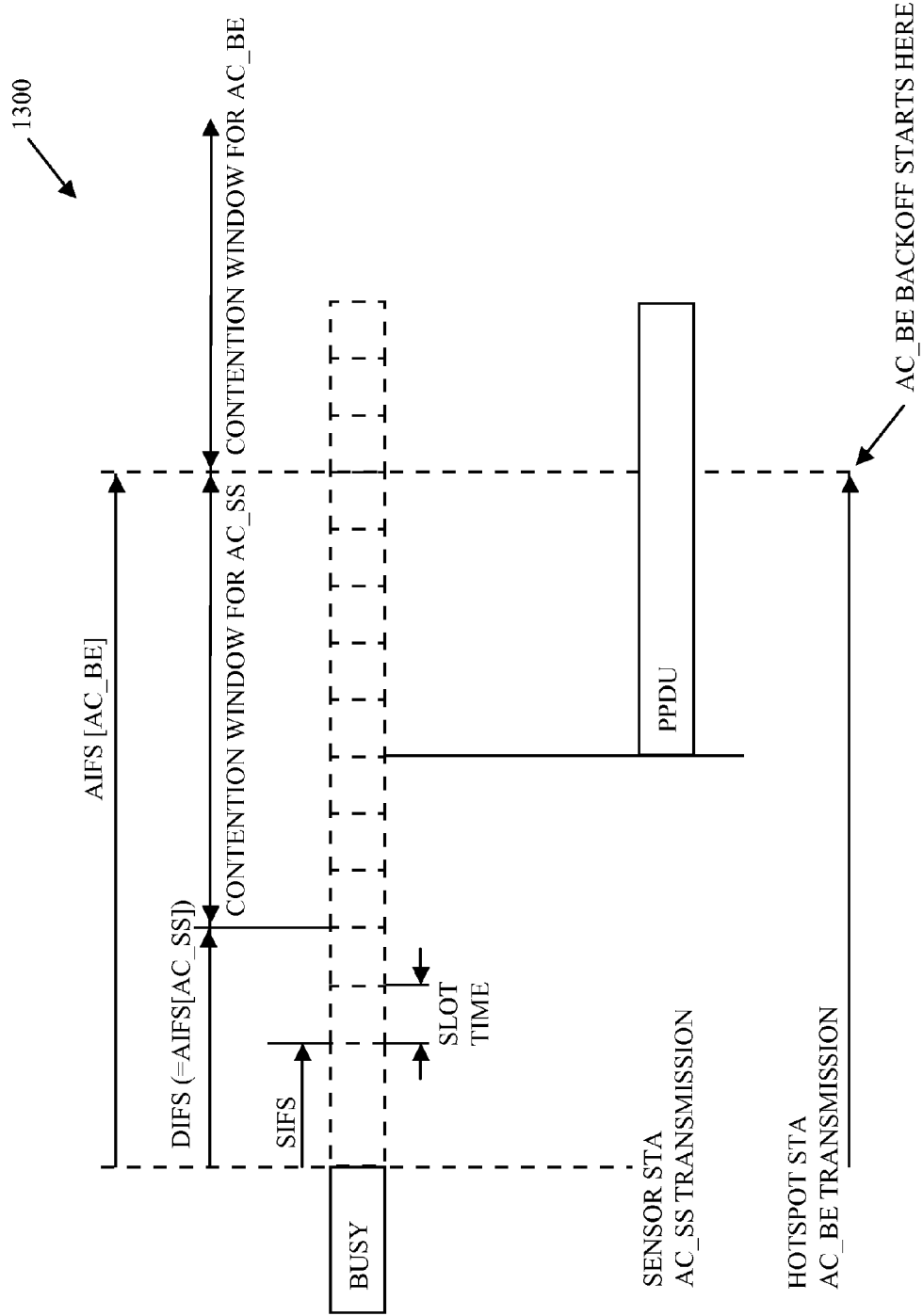
FIG. 1E depicts an embodiment of a timing diagram based upon the enhanced distributed channel access parameter set elements in FIG. 1D for establishing communications between wireless communication devices.

FIG. 1E depicts an embodiment of a timing diagram 1300 for the channel access relationship between AC_BE and AC_SS transmissions for access categories illustrated in table 1200 in FIG. 1D. As illustrated, a sensor STA and a hotspot STA are competing with each other for the channel. The sensor STA has sensor traffic mapped to AC_SS and the hotspot STA has best effort traffic mapped to AC_BE. Once the channel becomes idle, the two STAs will start defer+backoff. The sensor STA will defer for AIFS [AC_SS], which is equal to SIFS plus 2 times slot-time and then do backoff with the random number chosen from CW=[0, 7]. In this example, we assume the sensor STA chose the random number three.

The hotspot STA, on the other hand, will first defer for AIFS[AC_BE], which equals SIFS plus 10 times slot-time and then start doing the backoff. However, since the defer+backoff for the sensor STA is always less than AIFS [AC_BE], the sensor STA will always win the first round of contention. Furthermore, for situations in which the duty-cycle of the sensor traffic is very low (e.g. a packet transmission every few minutes), providing AC_SS with the highest priority will not significantly impede the AC_BE applications and the effect may be negligible.

Furthermore, if the PPDU transmission time (T) is too long (e.g., T>5 milliseconds), a sensor STA may have to wait too long to access the channel. For data rates below 1 Mbps, for example, it is easy to have very long PPDU transmission times with the packet size of a couple of hundreds of bytes. According to many embodiments, the PPDU transmission time may be limited so that the sensor STA does not need to wait too long for the channel to be idle, which will save power consumption by the sensor STA.

FIGS. 1F and 1G illustrate an alternative embodiment of an EDCA parameter set element 1400 and access category parameter table 1500 comprising values for the parameter record elements of the EDCA parameter set element 1400. According to the present embodiment, another way to provide sensor devices with the highest priority, or have the first open contention window, is to use all four access categories in the existing EDCA parameter set but to have different mapping between access categories and the traffic types with modified EDCA parameters.

The EDCA parameter set element 1400 may comprise fields such as an element identifier (ID) field 1402, a length field 1406, a quality of service (QoS) information (info) field 1408, a reserved field 1410, and parameter record elements including AC_BK parameter record 1412, AC_BE parameter record 1414, AC_VI parameter record 1416, and AC_VO parameter record 1418. The AC_BK parameter record 1412, AC_BE parameter record 1414, AC_VI parameter record 1416, and AC_VO parameter record 1418 may comprise values as those illustrated in table 1500 of FIG. 1G.

The element ID field 1402 may be one octet and may identify the element as an EDCA parameter set element 1400. The length field 1406 may be one octet and may define the length of the EDCA parameter set element 1400. The QoS info field 1408 may be one octet and may contain the EDCA Parameter Set Update Count subfield. And the reserved field 1410 may be one octet and may be reserved for future use.

FIGS. 1H and 1I illustrate an alternative embodiment of an EDCA parameter set element 1600 and access category parameter table 1700 comprising values for the parameter record elements of the EDCA parameter set element 1600. According to the present embodiment, another way to provide sensor devices with the highest priority, or have the first open contention window, is to add the new sensor access category (AC_SS) to the existing access category table and have different EDCA parameters.

The EDCA parameter set element 1600 may comprise fields such as an element identifier (ID) field 1602, a length field 1606, a quality of service (QoS) information (info) field 1608, a reserved field 1610, and parameter record elements including AC_BK parameter record 1612, AC_BE parameter record 1614, AC_VI parameter record 1616, AC_VO parameter record 1618, and AC_SS parameter record 1620. The AC_BK parameter record 1612, AC_BE parameter record 1614, AC_VI parameter record 1616, AC_VO parameter record 1618, and AC_SS parameter record 1620 may comprise values as those illustrated in table 1700 of FIG. 1I.

The element ID field 1602 may be one octet and may identify the element as an EDCA parameter set element 1600. The length field 1606 may be one octet and may define the length of the EDCA parameter set element 1600. The QoS info field 1608 may be one octet and may contain the EDCA Parameter Set Update Count subfield. And the reserved field 1610 may be one octet and may be reserved for future use.

Note that the values shown in the tables 1200, 1500, and 1700 are for illustrative purposes and may be other values.

Figure 2:
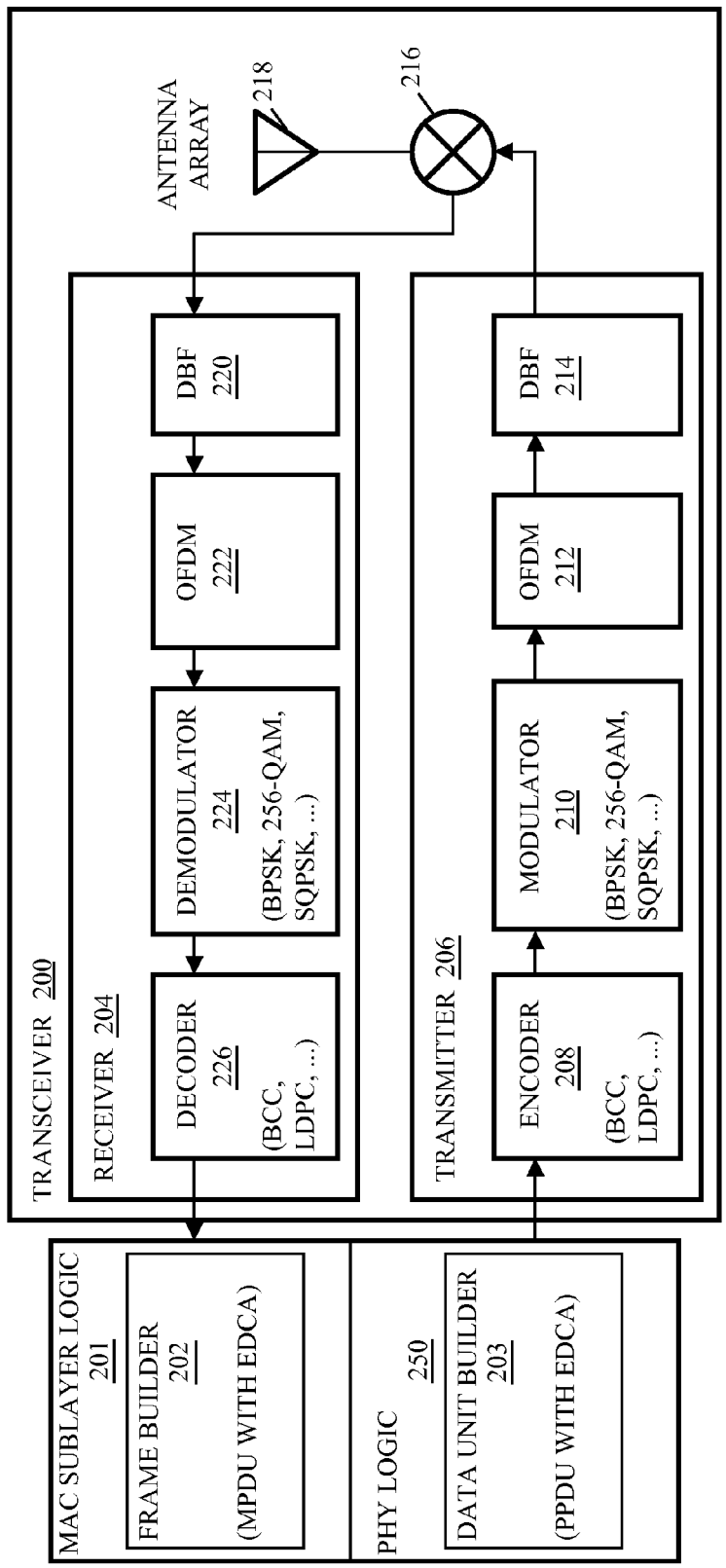
FIG. 2 depicts an embodiment of an apparatus to generate, transmit, receive and interpret a frame with enhanced distributed channel access parameter set elements.

FIG. 2 depicts an embodiment of an apparatus to generate, transmit, receive, and interpret an enhanced distributed channel access (EDCA) parameter set element in a frame. The apparatus comprises a transceiver 200 coupled with Medium Access Control (MAC) sublayer logic 201. The MAC sublayer logic 201 may determine a frame and the physical layer (PHY) logic 250 may determine the PPDU by encapsulating the frame with a preamble to transmit via transceiver 200.

In many embodiments, the MAC sublayer logic 201 may comprise a frame builder 202 to generate frames (MPDUs) such as one of the management frame 1060 with EDCA parameter set elements 1080, 1400, and 1600 illustrated in FIGS. 1A-I. The EDCA parameter set elements may comprise data indicative of traffic priorities for the access point within which the apparatus resides. The access point such as communications device 1010 and a station such as communications device 1030 in FIG. 1 may maintain the EDCA parameter set elements 1080, 1400, and 1600 and values in memory such as the management information base (MIB) 1032 illustrated in FIG. 1.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU to determine the particular type of frame and identify the EDCA parameter set element. The MAC sublayer logic 201 may determine the QoS info field value of the EDCA parameter set element to determine whether information in the EDCA parameter set element has changed, thus requiring that the MIB be updated. For instance, if the count in the EDCA Parameter Set Update Count subfield has changed since the last time the MIB was updated, the MAC sublayer logic 201 may determine that the MIB should be updated. On the other hand, if the count has not changed, the MIB may not need to be updated and the EDCA parameter set element may be discarded.

In some embodiments, the MPDU may comprise an element such as an information element defining a PPDU threshold transmission time. In such embodiments, the PPDU transmission time may be limited to be less than, e.g., T milliseconds. If the transmission for a PPDU may be longer than this threshold T milliseconds, the MAC sublayer logic 201 may fragment the packet so that one PPDU transmission does not consume more air-time than the PPDU threshold transmission time of, e.g., T milliseconds.

Figure 3:
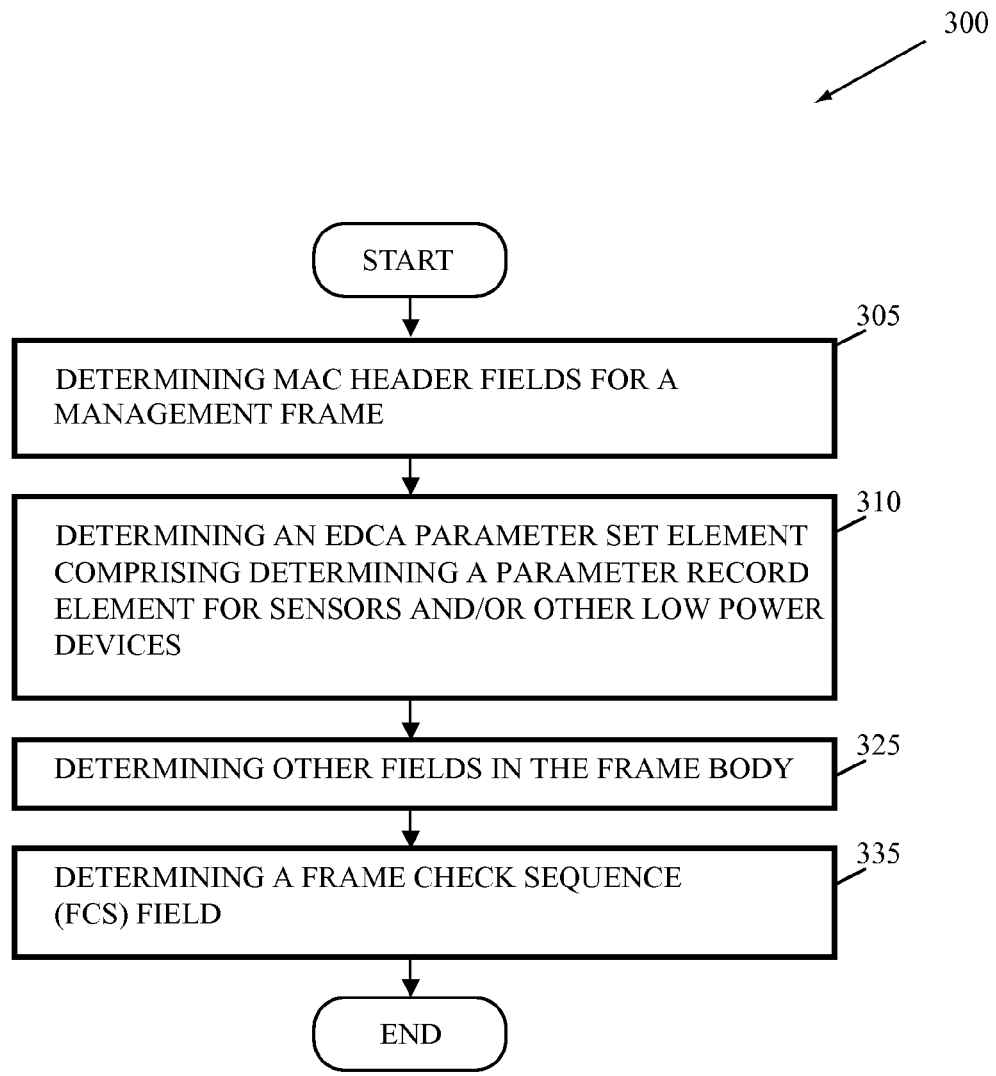
FIG. 3 depicts an embodiment of a flowchart to generate a frame with enhanced distributed channel access parameter set elements.

FIG. 3 depicts an embodiment of a flowchart 300 to generate or otherwise determine a management frame with an EDCA parameter set element such as the EDCA parameter set elements 1080, 1400, and 1600 described in FIGS. 1A-I. The flowchart 300 begins with a medium access control (MAC) sublayer logic determining a MAC header for a management frame (element 305).

The MAC sublayer logic may determine the EDCA parameter set element, which comprises determining a parameter record element for sensors and/or other low power devices (element 310). For instance, the MAC sublayer logic may access memory to retrieve an element structure for the EDCA parameter record set elements and assign the elements values such as the AIFSN, aCWmin, and aCWmax to establish a contention window for the low power consumption devices or sensors that opens prior to the contention windows for other access categories. In many embodiments, the contention window for the low power consumption devices or sensors closes prior to a contention window for another access category opening. For situations in which the low power consumption devices or sensors are low duty cycle, interference and latencies caused by the low duty cycle devices may be non-existent, negligible or otherwise tolerable by devices in the other access categories. In further embodiments, the AIFSN for the low power consumption devices or sensors may be lower than the AIFSNs for other access categories. And, in further embodiments, the low power consumption devices or sensors may otherwise be given the highest priority of the access categories.

The MAC sublayer logic may determine other elements of the management frame body frame (element 325). In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a frame. In still other embodiments, the MAC sublayer logic may generate the values of the fields based upon access to indications of the values for each.

After determining the other portions of the short frame, the MAC sublayer logic may determine a frame check sequence (FCS) field value (element 335) to provide for error corrections in bit sequences received by the receiving device.

FIGS. 4A-B depict embodiments of flowcharts 400 and 450 to transmit, receive, and interpret communications with a management frame with an EDCA parameter set element such as the EDCA parameter set elements 1080, 1400, and 1600 illustrated in FIGS. 1A-I. Referring to FIG. 4A, the flowchart 400 may begin with receiving a frame from the frame builder comprising the EDCA parameter set element. The MAC sublayer logic of the communications device may generate the frame as a management frame to transmit to an access point and may pass the frame as an MPDU to a data unit builder that transforms the data into a packet that can be transmitted to the access point. The data unit builder may generate a preamble to encapsulate the PSDU (the MPDU from the frame builder) to form a PPDU for transmission (element 405). In some embodiments, more than one MPDU may be encapsulated in a PPDU. In many embodiments, the physical layer logic may fragment the PPDU if transmission of the PPDU will take longer than a threshold transmission time for transmitting the PPDU.

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of an access point such as the receiver 204 in FIG. 2 receiving a communication signal via one or more antenna (s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine the value of the QoS info field of the EDCA parameter set element from the MPDU (element 470). For instance, the MAC sublayer logic may determine if the QoS info value indicates that the EDCA parameter set element has been updated or if this is the first EDCA parameter set element received for this association. If the element is updated or is the first one received from the AP, the remainder of the values from the EDCA parameter set element may be determined from the MPDU and used to update the management information base.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for channel access for wireless communications. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
    generating, by a processor of a medium access control sublayer logic, a frame comprising parameter records to change default management information base (MIB) attribute values for an enhanced distributed channel access (EDCA) Parameter Set element having parameter values for defining access categories of data traffic including best efforts traffic and sensor traffic, the parameter values including arbitration interframe space numbers and one or more contention window values for the access categories, wherein an arbitration interframe space number setting for a sensor access category is lower than an arbitration interframe space number for a best efforts access category for the default MIB attribute value, wherein the sensor access category provides the sensor traffic with priority over the best efforts traffic during competition in a first round of a contention window; and
    creating, by physical layer device, a physical layer protocol data unit comprising the frame with a preamble for transmission.

2. The method of claim 1, further comprising transmitting, by the antenna, the frame with the preamble.

3. The method of claim 1, further comprising storing, by the medium access control sublayer logic, at least part of the frame in memory.

4. The method of claim 1, wherein generating the frame comprises generating the frame defining a threshold transmission time for transmitting the physical layer protocol data unit.

5. The method of claim 1, wherein generating the frame comprises generating the frame, wherein the parameter records for the access categories comprise values for low power consumption stations that define the highest priority for traffic amongst the access categories for traffic.

6. A device comprising:
    a memory;
    a medium access control sublayer logic coupled with the memory to generate a frame comprising parameter records to change default management information base (MIB) attribute values for an enhanced distributed channel access (EDCA) Parameter Set element having parameter values for defining access categories of data traffic including best efforts traffic and sensor traffic, the parameter values including arbitration interframe space numbers and one or more contention window values for the access categories, wherein an arbitration interframe space number setting for a sensor access category is lower than an arbitration interframe space number for a best efforts access category for the MIB attribute value, wherein the sensor access category provides the sensor traffic with priority over the best efforts traffic during competition in a first round of a contention window; and
    a physical layer device to create a physical layer protocol data unit comprising the frame with a preamble for transmission.

7. The device of claim 6, further comprising a transmitter coupled with the medium access control logic to transmit the frame.

8. The device of claim 6, further comprising an antenna coupled with the transmitter to transmit the frame.

9. The device of claim 6, wherein the medium access control sublayer logic is coupled with the memory to store at least a portion of the frame.

10. The device of claim 6, wherein the medium access control logic comprises logic to generate the frame to define a threshold transmission time for transmitting the physical layer protocol data unit.

11. The device of claim 6, wherein the medium access control logic comprises logic to generate the frame, wherein the parameter records for the sensor stations comprise values for low power consumption stations with the highest priority for traffic amongst default management information base (MIB) attribute values for EDCA Parameter Set element parameter values.

12. A method comprising:
receiving, by a medium access control sublayer logic from a physical layer device, a frame comprising parameter records to change default management information base (MIB) attribute values for an enhanced distributed channel access (EDCA) Parameter Set element having parameter values for defining access categories of data traffic including best efforts traffic and sensor traffic, the parameter values including arbitration interframe space numbers and one or more contention window values for the access categories, wherein an arbitration interframe space number setting for a sensor access category is lower than an arbitration interframe space number for a best efforts access category for the default MIB attribute value, wherein the sensor access category provides the sensor traffic with priority over the best efforts traffic during competition in a first round of a contention window; and
storing, by the medium access control sublayer logic, based upon the frame, the parameter record for the access categories for the sensor traffic in a management information base memory.

13. The method of claim 12, further comprising receiving, by the antenna, the frame encapsulated by the preamble.

14. The method of claim 12, further comprising storing in memory, by the medium access control sublayer logic, a threshold transmission time defined in the frame for transmitting a physical layer protocol data unit.

15. The method of claim 12, further comprising determining the parameter record for the access categories for the sensor stations defines the highest priority for traffic amongst the access categories for traffic.

16. The method of claim 12, further comprising determining the frame defines an access category for low power consumption stations with an arbitration interframe space number of two.

17. The method of claim 12, wherein determining the frame defines an access category for low power consumption stations with a minimum contention window setting of (aCWmin+1)/2−1.

18. The method of claim 12, wherein determining the frame defines an access category for low power consumption stations with a maximum contention window setting of aCWmax.

19. A device comprising:
a medium access control sublayer logic coupled with a memory to receive a frame from a physical layer device comprising parameter records to change default management information base (MIB) attribute values for an enhanced distributed channel access (EDCA) Parameter Set element having parameter values for defining access categories of data traffic including best efforts traffic and sensor traffic, the parameter values including arbitration interframe space numbers and one or more contention window values for the access categories, wherein an arbitration interframe space number setting for a sensor access category is lower than an arbitration interframe space number for a best efforts access category for the MIB attribute value, wherein the sensor access category provides the sensor traffic with priority over the best efforts traffic during competition in a first round of a contention window; and
the memory to store by the medium access control sublayer logic, based upon the frame, the parameter record for the access categories for the sensor traffic in a management information base.

20. The device of claim 19, wherein the medium access control logic comprises logic to determine the parameter record for the access category for low power consumption stations that defines the highest priority for traffic amongst default management information base (MIB) attribute values for EDCA Parameter Set element parameter values.

21. The device of claim 19, wherein the medium access control logic comprises logic to determine that the frame defines an access category for low power consumption stations with an arbitration interframe space number setting of two.

22. The device of claim 19, wherein the medium access control logic comprises logic to determine that the frame defines an access category for low power consumption stations with a minimum contention window setting of (aCWmin+1)/4−1.

23. A machine-accessible product comprising:
a non-transitory medium containing instructions which cause a processor to perform operations when the instructions are executed by the processor, wherein the operations:
change parameter records from default management information base (MIB) attribute values for an enhanced distributed channel access (EDCA) Parameter Set element having parameter values for defining access categories of data traffic including best efforts traffic and sensor traffic, the parameter values including arbitration interframe space numbers and one or more contention window values for the access categories; and
change the default MIB attribute values for the EDCA Parameter Set element parameter values for the best efforts traffic to values for the sensor traffic by defining an arbitration interframe space number setting for a sensor access category that is lower than an arbitration interframe space number for a best efforts access category for the default MIB attribute value, wherein the sensor access category provides the sensor traffic with priority over the best efforts traffic during competition in a first round of a contention window.

* * * * *